United States Patent [19]

Tack

[11] 4,040,156
[45] Aug. 9, 1977

[54] ADJUSTING DEVICE FOR MILLING CUTTERS

[75] Inventor: Hans Tack, Heiligenhaus, Germany

[73] Assignee: Fried. Krupp Gesellschaft mit beschrankter, Essen, Germany

[21] Appl. No.: 677,852

[22] Filed: Apr. 16, 1976

[30] Foreign Application Priority Data

Apr. 17, 1975 Germany .............................. 2516944

[51] Int. Cl.² .............................................. B26D 1/00
[52] U.S. Cl. ...................................... 29/96; 29/105 A
[58] Field of Search ..................... 29/96, 105 A, 105 R

[56] References Cited

U.S. PATENT DOCUMENTS

| 2,982,009 | 5/1961 | Swenson | 29/105 A |
| 3,104,453 | 9/1963 | Greenleaf | 29/105 A |
| 3,492,709 | 2/1970 | Le Barre | 29/96 |
| 3,847,555 | 11/1974 | Pegler et al. | 29/105 R |

FOREIGN PATENT DOCUMENTS 2,043,453  9/1970  Germany .............................. 29/105 A Primary Examiner—Leonidas Vlachos
Attorney, Agent, or Firm—Spencer & Kaye

[57] ABSTRACT

A blade holder component secured to a revolving milling cutter body includes walls which define a recess for receiving a cutting blade, and which support the cutting blade inserted in the recess. The blade holder component incorporates an adjusting device having a resiliently deformable tongue which is defined by a single slot extending into the blade holder component from the zone of the blade-receiving recess. The tongue has a terminal portion including a support area for engaging the cutting blade received in the recess. A set screw passing through the tongue and traversing the slot is threadedly engaged in the blade holder component adjacent the tongue. By turning the set screw, the position of the resilient tongue is changed for altering the orientation of the cutting blade in the recess of the blade holder component.

4 Claims, 2 Drawing Figures

ADJUSTING DEVICE FOR MILLING CUTTERS

BACKGROUND OF THE INVENTION

This invention relates to an adjusting device which is used for accurately setting cutting blades in milling tools and which is incorporated in a blade holder component inserted into a groove of a revolving cutter body. The blade holder component has an edge-wise open recess corresponding to the outline of a cutting blade which, when inserted, is supported by the wall portions defining the recess. The blade holder component further has a portion which is elastically deformable by a screw and by means of which the position of the cutting blade may be adjusted in the recess.

For obtaining a satisfactorily machined surface with a milling tool carrying a plurality of cutting blades, it is indispensable to install and adjust the cutting blades in such a manner that their cutting edges have a highly accurate axial cutting position British Patent No. 958,725 discloses an adjusting device for cutting blades of the above type in which the holder component which is provided with a recess for receiving the cutting blades is displaceable with respect to the revolving cutter body by means of a screw member mounted in the latter. With this component, however, only a coarse adjustment of the axial cutting position of the cutting edges is possible. It is a particular disadvantage of this arrangement that for correcting the axial cutting position, the holder component has to be shifted in the groove of the revolving cutter body.

In the German Laid-Open Application (Offenlegungsschrift) No. 2,043,453, there is disclosed a displaceable adjusting device for cutting blades of milling tools. The device is incorporated in a plane-parallel blade holder component having on one side an integral elastic which is bounded by two slots that extend from the blade-receiving recess in the holder component and which, at the frontal side, projects into the recess. The tongue serves as a support face for the inserted cutting blade and can be swung, by means of a threaded pin which traverses one of the slots, about its root in an elastic manner, whereby the distance between the location of support and the milling plane is changed. This holder component has the disadvantage that two slots have to be provided and that at the area of the tongue which is pressed by the very small threaded pin, undesired deformations may appear, particularly in case of certain broad finishing blades operating under significant axial cutting pressure. Consequently, an exact position for the cutting blades be unequivocally determined. Further, in adjusting devices of this type, quench cracking may occur at the base of the slots as a result of stresses generated during heat treatment.

SUMMARY OF THE INVENTION

It is an object of the invention to provide an adjusting device for cutting blades of milling tools which makes possible the adjustment of the cutting edges of the inserted cutting blades with great accuracy and which has a dimensional stability for long periods of time and which may be manufactured in an economic manner.

This object and others to become apparent as the specification progresses, are accomplished by the invention, according to which, briefly stated, a blade holder component secured to a revolving milling cutter body includes walls which define a recess for receiving a cutting blade and which support the cutting blade inserted in the recess. The blade holder component incorporates an adjusting device having a resiliently deformable tongue which is defined by a single slot extending into the holder component from the zone of the blade-receiving recess. The tongue has a terminal portion including a support area for engaging the cutting blade received in the recess. A set screw passing through the tongue and traversing the slot is threadedly engaged in the blade holder component adjacent the tongue. By turning the set screw, the position of the resilient tongue is changed for altering the orientation of the cutting blade in the recess of the blade holder component.

Expediently, the end of the slot merges approximately tangentially in a hole which is provided transversely in the blade holder component.

According to a further feature of the invention, the blade holder component has, above the tongue, a threaded bore which receives a second screw by means of which the angular position of the adjusting device can be adjusted with respect to the revolving cutter body. An axial support and an exact alignment of the adjusting device is ensured by a lug which forms part of the blade holder component and which, with one side, engages a circumferential groove provided in the cutter body.

The adjusting device designed according to the invention is advantageous when compared to the prior art arragements, in that due to the stable design of the tongue and the tensioning by means of a screw having a large-surface head, the adjusting device has a superior dimensional staility particularly when used for long periods and under heavy duty conditions, without adversely affecting the manipulation and precision of the adjustment of the cutting blades. The invention further makes possible an economic manufacture of the blade holder component which has a very long life expectancy.

DESCRIPTION OF THE PREFERRED EMBODIMENT

Figure 1:
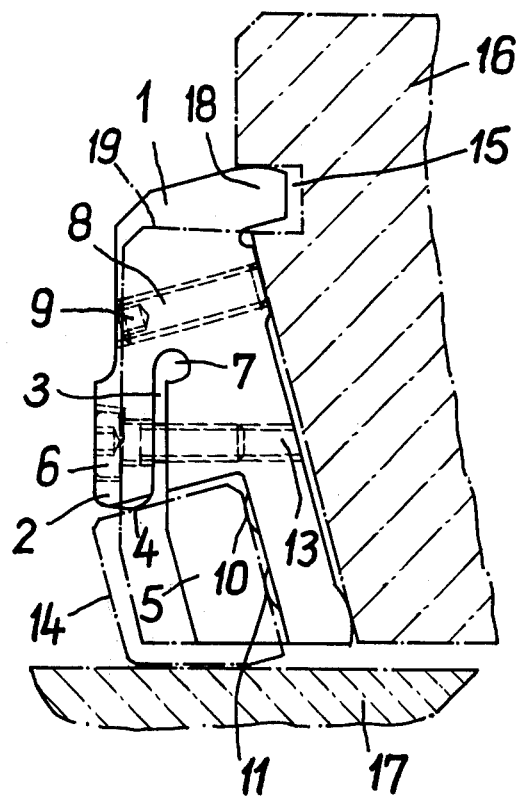
FIG. 1 is a front elevational view of a preferred embodiment of the invention.
Figure 2:
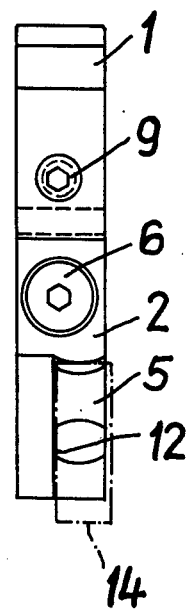
FIG. 2 is a side elevational view of the same embodiment.

Turning now to FIGS. 1 and 2, there is shown a plane-parallel blade holder component 1 and comprising an integral tongue 2 which extends on one side of the holder component 1. The tongue 2 which has a root and a free terminus, is formed by providing in the holder component 1 a slot 3 which at its inner end merges tangentially into a circular aperture 7 extending transversely through the holder body 1. This configuration ensures that the tongue 2 has elastic properties in response to forces exerted on the tongue and seeking to enlarge or narrow the slot 3. The holder component 1 has a recess 5 adapted to receive a cutting blade as shown in phantom lines at 14. The holder component 1 is secured to a revolving milling cutter 16 for machining a workpiece 17. The cutting blade is, at its circumference, engaged at support areas 4, 10 and 11 and along its frontal face it is firmly held in the recess 5 along the surface 12. The support area 4 is arranged on the free terminus of the tongue 2, while the support areas 10 and 11 are arranged on the walls that define the recess 5.

In the blade holder component 1 there is provided a threaded bore 13 which threadedly receives a set screw 6 passing through the tongue 2 and bridging transversely the slot 3. The length dimension of the set screw 6 extends substantially perpendicularly to the orientation of the throughgoing aperture 7. The radial underside of the head of the set screw 6 engages a countersunk shoulder portion of the tongue 2. By turining the screw 6, the tongue 2 alters its position (thus narrows or widens the slot 3) together with the support area 4, whereby the axial cutting position of the blade is adjusted.

In he blade holder component 1, spaced from the tongue root, there is provided a throughgoing threaded bore 8 threadedly receiving a set screw 9. By turning the set screw 9, the angular position of the holder component 1 in the tool body 16 and thus the position of the cutting edges with respect to the milling plane is changed. In this manner, among others, the inclination of the milling spindle may be compensated for. The holder component 1 is arranged and clamped into a groove (indicated at 19 with phantom lines) which is provided in the periphery of the cutter body 16 and which is oriented parallel or obliquely with respect to the cutter axis. The holder component 1 has a lug 18 which, along one flank, engages one side of a circumferential annular groove 15 provided in the cutter body 16 for axially supporting and accurately aligning the holder component 1.

It will be understood that the above description of the present invention is susceptible to various modifications, changes and adaptations, and the same are intended to be comprehended within the meaning and range of equivalents of the appended claims.

What is claimed is:

1. In a blade holder component secured to a revolving milling cutter body and having wall means defining a recess for receiving a cutting blade and supporting the cutting blade inserted in the recess; an adjusting device having a resiliently deformable tongue forming an integral part of the blade holder component and being in engagement with the cutting blade; a set screw connected to the resiliently deformable tongue for changing the position of the latter to adjust the orientation of the cutting blade in the recess; the improvement wherein said resiliently deformable tongue is defined by a single slot extending into the blade holder component from the zone of the blade-receiving recess, said tongue having a root and a free terminal portion, said free terminal portion including a support area for engaging the cutting blade received in said recess; said set screw passing through said tongue and traversing said single slot, said set screw having a head engaging, with a shoulder, said tongue; said set screw having an end portion threadedly engaged in said blade holder component adjacent said tongue.

2. A blade holder component as defined in claim 1, further comprising means defining a throughgoing aperture in said blade holder component adjacent the root of said tongue, said aperture being oriented in a direction normal to the length dimension of said set screw, said slot merging at least approximately tangentially into said aperature.

3. A blade holder component as defined in claim 1, further comprising means defining a throughgoing threaded bore situated in said blade holder component spaced from said tongue and adjacent the root thereof; an additional set screw threadedly received in, and passing through said threaded bore, said additional set screw engaging said milling cutter body for adjusting the angular position of said blade holder component with respect to said milling cutter body.

4. A blade holder component as defined in claim 3, wherein said milling cutter body includes means defining a peripheral circumferential groove; the improvement further comprising a lug forming part of and projecting from said blade holder component; said lug extending into said groove and engaging one side thereof.

* * * * *

UNITED STATES PATENT AND TRADEMARK OFFICE
CERTIFICATE OF CORRECTION

PATENT NO. : 4,040,156
DATED : August 9th, 1977
INVENTOR(S) : Hans Tack

It is certified that error appears in the above-identified patent and that said Letters Patent are hereby corrected as shown below:

In the heading of the patent, change the Assignee's name to read: --Fried. Krupp Gesellschaft mit beschränkter Haftung--.

Column 1, line 37, after "elastic" insert --tongue--; line 51, after "blades" insert --cannot--.

Column 2, line 28, change "arragements" to --arrangements--; line 31, change "staility" to --stability--; line 48, delete "and".

Column 3, line 6, change "turining" to --turning--; line 11, change "he" to --the--.

Column 4, line 22, change "aperature" to --aperture--.

Signed and Sealed this

Twenty-fourth Day of January 1978

[SEAL]

Attest:

RUTH C. MASON
Attesting Officer

LUTRELLE F. PARKER
Acting Commissioner of Patents and Trademarks